United States Patent
Bello et al.

[11] Patent Number: 5,944,802
[45] Date of Patent: Aug. 31, 1999

[54] DYNAMIC SPEED MATCHING OF HOST CHANNEL AND DEVICE DATA TRANSFERS

[75] Inventors: Keith Anthony Bello; Donald Marvin Nordahl; Juan Antonio Yanes, all of Tucson, Ariz.

[73] Assignee: International Business Machines Corporation, Armonk, N.Y.

[21] Appl. No.: 08/919,853

[22] Filed: Aug. 28, 1997

[51] Int. Cl.[6] ................................................ G06F 13/14
[52] U.S. Cl. ........................ 710/52; 710/53; 710/57; 711/113; 711/133
[58] Field of Search .......................... 395/872, 250; 710/52, 53, 57; 711/113, 133

[56] References Cited

U.S. PATENT DOCUMENTS

| | | | |
|---|---|---|---|
| 4,860,193 | 8/1989 | Bentley et al. | 364/200 |
| 4,931,924 | 6/1990 | Kageura | 364/200 |
| 5,134,563 | 7/1992 | Tayler et al. | 395/250 |
| 5,146,576 | 9/1992 | Beardsley et al. | 395/425 |
| 5,412,780 | 5/1995 | Rushton | 395/250 |
| 5,566,315 | 10/1996 | Milillo et al. | 395/440 |
| 5,696,991 | 12/1997 | Chang | 395/872 |
| 5,778,420 | 7/1998 | Shitara et al. | 395/250 |

FOREIGN PATENT DOCUMENTS 63-292344  11/1988  Japan.

*Primary Examiner*—Thomas C. Lee
*Assistant Examiner*—Abdelmoniem I. Elamin
*Attorney, Agent, or Firm*—Gray Cary Ware Freidenrich

[57] ABSTRACT

The present invention reduces the delay in the completion of transferring data from a data channel to an input/output device and the time a host unit is released from performing the data transfer function. A time reduction is realized by monitoring the current data transfer between the data channel and a buffer device to establish a transfer rate. The transfer rate is used to anticipate and coordinate the transfer of the last bit of data from the data channel to coincide with the receipt of the data by the input/output (I/O) unit, effectively eliminating buffer device delay and allowing the host unit to be released from performing the data transfer. In the preferred embodiment, the transfer of the last bit of data by the data channel occurs at substantially the same time as the last bit of data is received by the I/O unit.

18 Claims, 4 Drawing Sheets

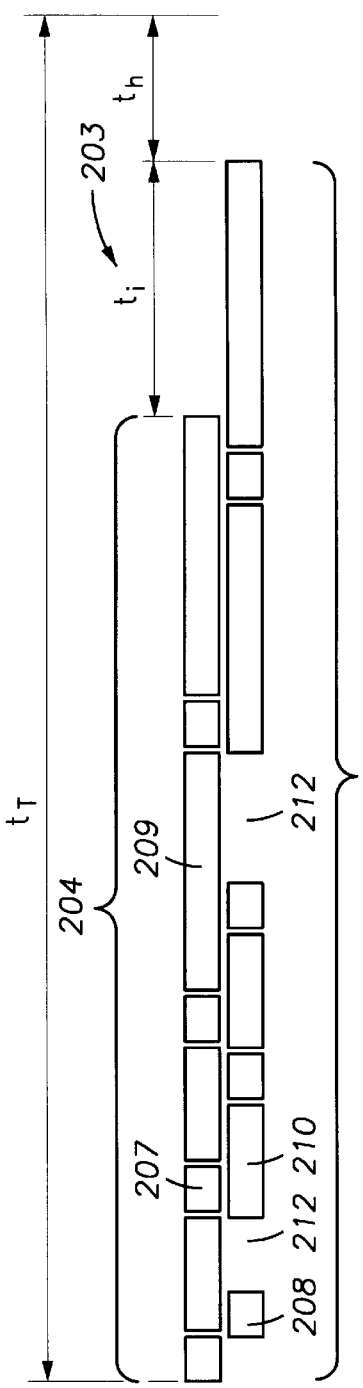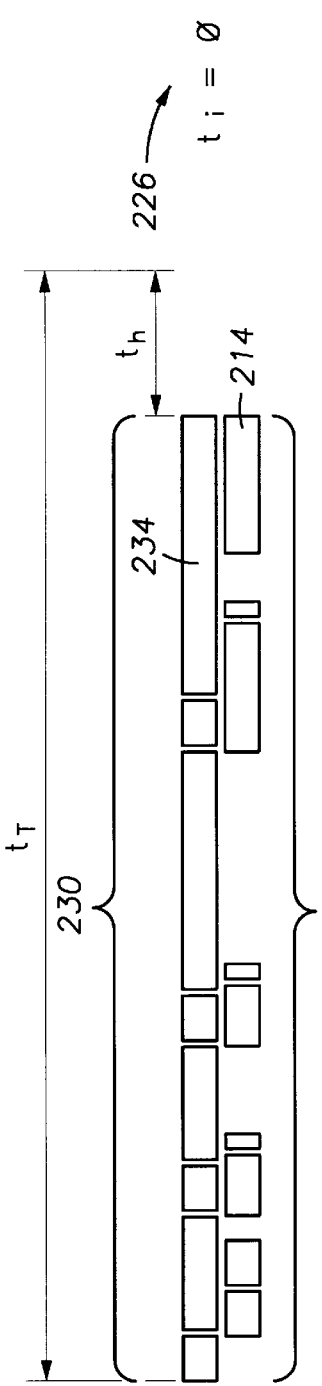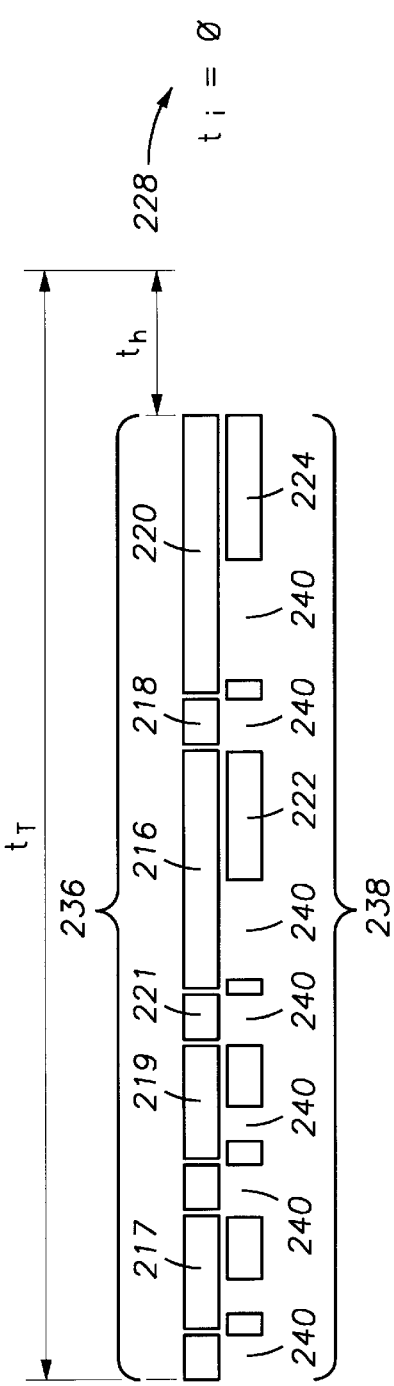

5,944,802

DYNAMIC SPEED MATCHING OF HOST CHANNEL AND DEVICE DATA TRANSFERS

BACKGROUND OF THE INVENTION

1. Field of the Invention

The present invention relates to buffered data devices used to minimize the time dedicated by a host unit to the transfer of data between an input/output (I/O) device and the host. More particularly, the invention concerns a method and apparatus for reducing or eliminating the delay between the time the last bit of data is transferred from the host unit to the input/output (I/O) unit and the time the host unit is no longer involved in performing the data transfer function.

2. Description of the Related Art

Data processing systems are exemplified by a host processor which can manipulate, format and execute arithmetic operations on data received from an I/O unit. Tape readers, disk readers and other peripheral sources of data are generally more limited in their capacity to transfer data than the host processor and the channel connecting the host processor to the I/O unit. Speed matching buffers are typically employed to match the I/O unit data transfer rate to the channel data transfer rate.

Generally, in prior art buffer devices, an effort is made to preserve the channel data transfer rate to maximize channel utilization while serving a plurality of I/O devices. This goal can be achieved by first writing the channel data into a buffer memory at the data channel transfer rate. When the I/O unit is ready to receive the I/O unit data, the buffer memory contents are read to the I/O unit at the I/O unit transfer rate.

Such techniques, while preserving channel capacity and data transfer capabilities, degrade overall system performance. Degradation of overall system performance is common because the time required to write to the buffer memory with channel data, and then to read the memory contents, can be greater than the time required if the I/O unit were directly connected for data transfer from the data channel. This time loss accounts for the majority of time it takes to transfer data from a host system utilizing the data channel to the I/O unit.

Various attempts have been made in the past to reduce the time lost in making such a data transfer. One technique, described in U.S. Pat. No. 4,258,418, describes a buffer having a threshold which identifies the buffer memory capacity level at which the READ operation is to commence. The READ operation will begin before the WRITE operation is completed. The threshold is selected to avoid exceeding the capacity of the buffer without regard to data transfer degradation. The buffer memory is written and read such as to maintain the buffer storage level at a predetermined fraction of the total storage capacity.

In another technique, described in U.S. Pat. No. 4,860,193, a buffer is described using a different threshold which identifies a bit of the next consecutive block of data bits to be loaded in the buffer memory. When the bit is received by the buffer memory, the buffer unload cycle begins. The buffer load and unload cycles are conducted simultaneously. An optimum threshold is determined by observing the previous data transfer. The invention assumes that data transfer sizes tend to an average data transfer size in data processing applications. From examining previously received data transfers, a threshold is established which identifies an expected bit length for the next consecutive transfer of data to be loaded into memory. This method requires that previously loaded data blocks be monitored in order for the threshold to be established and updated.

For the foregoing reasons, there is a need for a method and apparatus to maximize data transfer rates based upon data currently being transferred from a data channel to an I/O unit and which minimizes degradation to overall system performance.

SUMMARY OF THE INVENTION

Broadly, the present invention satisfies the need to minimize the delay in completing the transfer of data by a host unit to an I/O unit and the time the host unit is released from involvement in the data transfer function. A time reduction is realized by monitoring the current data transfer between the host unit and the I/O unit to anticipate when the last bit of data will be transferred ("anticipated transfer"). The anticipated transfer is used to coordinate the actual transfer of the last bit of data from the host unit to coincide with the receipt of the data by the I/O unit, thereby allowing the host unit to be signalled that the data has been received by the I/O unit and "hardened." "Hardening" refers to the I/O unit being given responsibility for the data transferred, where the likelihood of corruption of the data cached in the I/O unit is as improbable as the data being corrupted if it were cached on a more permanent medium, such as a magnetic storage medium. Once the data is hardened, it is said to be "committed" to the I/O unit. In the preferred embodiment, the transfer of the last bit of data by the host unit occurs at substantially the same time the last bit of data is received by the I/O unit.

In one embodiment, the invention may be implemented to provide a method to reduce the overall host transfer time required to transfer data between a host unit and an I/O unit via a data channel. The method anticipates when a data transfer including a last bit of data is sent by monitoring a segment of a length of data currently being transferred to an I/O unit. The technique is adaptive, anticipating the last bit transfer for a current data transfer based upon segments of the current data being transferred.

When the data channel transfer rate is less than the I/O transfer rate, the anticipated transfer is selected to allow the transfer of the last bit of data from the host unit via the data channel to the buffer device to occur substantially simultaneous to the transfer of the last bit of data from the buffer device to the I/O unit, effectively neutralizing any delay induced by the buffer device. This allows the I/O unit to begin hardening the data sooner than if a buffer delay occurred. The sooner the data is hardened, the sooner the I/O unit can signal the host unit that a transfer is complete and committed. This commit signal notifies the host unit that it is no longer needed to perform the data transfer function.

In the preferred version of the invention, the anticipated transfer is determined based upon a minimum transfer data length of K bits. A data segment $L_{DF}$ which is at least K bits in length—and is a segment of a data field of N length which is to be transferred—is copied from the data channel to the buffer device. Segment $L_{DF}$ may be transferred by itself or in conjunction with other data segments either of identical or varying lengths. Based upon a transfer rate $R_H$ of $L_{DF}$ between the data channel and a buffer device, $T_R$ and $T_D$ are used to determine a threshold, where $T_R$ is the time remaining to transfer the N length data field from the data channel to the buffer device, and $T_D$ is the time required to transfer data of length N from the buffer device to the I/O unit. If $T_D \geq T_R$, the data transfer from the buffer to the I/O unit is started. Otherwise, the data transfer is delayed for at least a period of time equal to $T_R-T_D$. The buffer unload cycle is sequenced so that the buffer unloads the last bit of data to be transferred substantially simultaneous to the last bit of data being transferred from the data channel to the buffer device.

In another embodiment, the invention may be implemented to provide an apparatus to minimize the delay in notifying a host unit that a data transfer between the host unit and an I/O unit has been completed. In still another embodiment, the invention may be implemented to provide a signal-bearing medium tangibly embodying a program of machine-readable instructions executable by a digital data processing apparatus to perform method steps to minimize sending delay in data from a host unit via a data channel to an I/O unit and the data being received by the I/O unit.

The invention affords its users with a number of distinct advantages. One advantage is that the invention minimizes or eliminates the time transferred data remains in the buffer device. At the end of the data transfer, the host unit may be more quickly signalled that the data has been committed to the I/O unit. For example, the host unit may be signalled that its functions relative to transferring the data are complete almost simultaneous to the transfer of the last bit of data from the data channel to the buffer device, assuming the time required to harden the data is negligible. Previously, the host unit had to wait for any buffer-caused delay in transferring the data to the I/O unit.

The invention also provides a number of other advantages and benefits, which should be apparent to one skilled in the art after reviewing the following description of the various embodiments of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIG. 2A illustrates the typical time delay $t_i$ between the time a last data bit is sent by a host unit to an I/O unit and the time the data is received by the I/O unit;

FIG. 2B illustrates the time delay between the time a last data bit is sent by a data channel to an I/O unit and the time a data received acknowledgement is transmitted by the I/O unit to the data channel in accordance with one embodiment of the current invention;

FIG. 2C illustrates the time delay between the time a last data bit is sent by a data channel to an I/O unit and the time a data received acknowledgement is transmitted by the I/O unit to the data channel in accordance with another embodiment of the current invention;

DETAILED DESCRIPTION OF THE PREFERRED EMBODIMENTS

Hardware Components & Interconnections

One aspect of the invention concerns a data buffer system for reducing or eliminating the delay between the time the last bit of data is transferred from a host unit via a data channel to an I/O unit and the time a host unit is signalled that it is no longer needed for performing the data transfer functions. The apparatus may be embodied by various hardware components and interconnections, one of which is described in FIG. 1.

Figure 1:
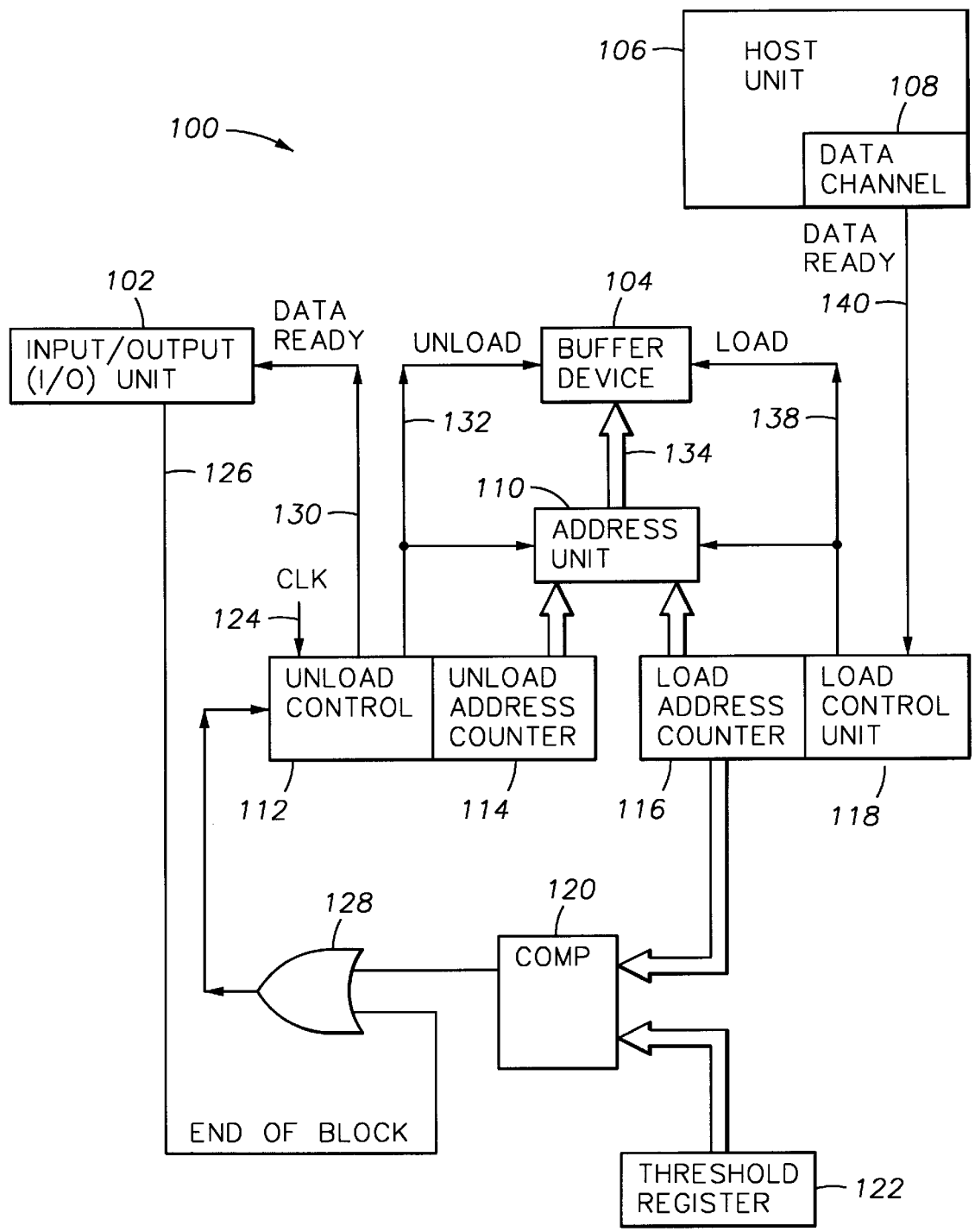
FIG. 1 is a block diagram of the hardware components and interconnections of a dynamic speed matching apparatus in accordance with one version of the invention.

FIG. 1 shows a block diagram of a buffer system 100, and illustrates the transfer of data from a host unit 106 via a high speed data channel 108 to an I/O unit 102. The architecture of FIG. 1 its representative of data buffering techniques which permit the lower speed data channel 108 to transfer data to the higher speed I/O unit 102. A buffer device 104 is used to store at least a portion of a data block or data file being transferred from the host unit 106 to the I/O unit 102. The host unit 106 is interfaced with data channel 108 thereby allowing data to be transferred from the host unit 106 to the I/O unit 102 via the data channel 108. The I/O unit 102 may be a tape recorder, disk reader or other source for supplying data organized as blocks of data bits.

During reading of data bits from the host unit 106, a load control unit 118 will advance a load address counter 116 each time a new data bit is presented for loading in buffer device 104, as indicated by data ready line 140. The new load address of load address counter 116 will be presented by address unit 110 through an address bus 134 to the buffer device 104, and the load operation activated by the load line 138. Thus, each sequentially received data bit is stored at a new subsequent buffer device 104 location as defined by the load address counter 116.

When a particular threshold is reached corresponding to a unique number of data bits which have been stored in buffer device 104, comparator 120 will apply a logic signal through OR gate 128 to buffer unload control 112. This threshold, as identified by threshold register 122, will mark the beginning of the unloading of buffer device 104 to the I/O unit 102.

The unload control 112 will have initialized the unload address counter 114. The unload address counter 114 is connected to the address unit 110. Upon the threshold compare the unload address is switched to memory address bus 134 by the unload 132 and data ready 130 is supplied to I/O unit 102. Typically, the load control unit 118 operates at a higher rate than the unload control 112. However, unit 118 may operate at a slower speed than control 112. Thus, before completing storage of the entire data block received from data channel 108, the buffer device 104 usually begins an unload cycle to transfer data to the I/O unit 102.

A gate 128, in the preferred embodiment an OR gate, combines an end of block signal from line 126 of the I/O unit 102 or an end of block from the host with the comparator 120 output. In the event that the number of bits in a block of data being read to I/O unit 102 is less than the number indicated by the threshold register 122, this condition will initiate the unload operation of buffer device 104. A clock 124 is connected to the unload control 112 and supplies a signal coordinating the unload control signal 112 data ready 130 to the I/O unit 102.

The benefits of anticipating the transfer of the last bit of data of a data block from the data channel 108 to the I/O unit 102 via buffer device 104 can be seen by referring to FIGS. 2A, 2B, and 2C.

FIG. 2A represents a typical timing sequence for the transfer of data from the data channel 108 to the buffer device 104 versus the transfer of data from the buffer device 104 to the I/O unit 102. A time $t_i$ represents the time difference between the time data is transferred from the data channel to the I/O unit and the time the host unit is notified that it is no longer needed in the data transfer. This time difference may be explained by examining what affects the data transfer rate relevant to this invention.

Data channel transfer rates are influenced by a variety of factors such as the transmission network within the host unit 106 which must be traversed in order to gather the data to be transferred. Additionally, the number of switches encountered in the host unit 106, the number of control transactions required to set up the data transfers between the host unit 106 and the data channel 108, the buffering capabilities of both the host unit 106 and the data channel 108, the length of allowed bursts of data that can be sent or received before transmissions must be interrupted in order to resynchronize the host unit 106 with the data channel 108, and the structure of the data as stored within the host unit 106, amongst other things, all affect the speed with which the data can be gathered by the host unit 106, transferred to the data channel 108, and then transmitted to the I/O unit 102.

I/O unit transfer rates depend on similar factors. However, as is well known to one practiced in the art, a distinction can be made in that the I/O unit factors are somewhat predictable. For example, the I/O unit follows repeatable and substantially predictable processes regarding the way data is received, transmitted, and how the data is stored. This is understandable in that an I/O unit commonly performs a single function such as data storage, whereas data channels and host units may perform a variety of functions.

As shown in FIG. 2A, the problem solved by the current invention lies in attempting to arrange a data transfer to the I/O unit 102 from the buffer device 104 to finish at substantially the same time as the data channel 108 transfers the last data bit to the buffer device 104. This allows the completion of the data transfers to the I/O unit 102 to be reported as quickly as possible to the data channel 108 and the host unit 106. By anticipating and minimizing the length of time between when the data channel 108 began the transfer of the data and the time the data was received at the I/O unit 102, the host unit 106 may be quickly signaled that it is no longer needed in the data transfer process. The delay between the time the data channel 108 transmits the last bit of data to the buffer device 104, and the time the I/O unit 102 receives the last bit of data, hardens the data and signals the host unit 106 and the data channel 108, increases the time the host unit 106 must be involved in the data transfer process.

FIG. 2A shows a first group of data transfers 204 between data channel 108 and buffer device 104. FIG. 2A also shows a second group of data transfers 206 between the buffer device 104 and I/O unit 102. As can be seen from the figure, the group of data transfers 204 and 206 are broken into discrete blocks of varying lengths of data, represented in part by blocks 207, 208, 209 and 210, which may be transferred in a single transfer. The second group of data transfers 206 includes empty data blocks 212 which represent a break in the concatenated data blocks. A data block 202 is shown as a representative length of the minimum data block size that is monitored by the present invention in coordinating the data transfer. A time $t_t$ 203 is linearly depicted to represent the time difference between the transfer of the last bit of data from the data channel 108 to the buffer device 104 versus the transfer of the last bit of data from the buffer device 104 to the I/O unit 102 ("buffer delay"). The time $t_h$ represents the time the I/O unit 102 takes to harden the data. After the data is hardened, the I/O unit 102 signals that the data has been committed. The time $t_t$ is the total transaction time for transferring the data. As is apparent from FIG. 2A, the last bit of data of the first group 204 transferred between data channel 108 and the buffer device 104 ends at an earlier time than does the transfer of the last bit of data of the second group 206 between the buffer device 104 and the I/O unit 102. Because the time to transfer the data is a function of the host unit 106 configuration as discussed above, and the hardening time $t_h$ is a function of the I/O unit 102, the present invention minimizes or eliminates the buffer delay $t_i$.

To minimize or eliminate $t_i$, the present invention measures the data rate of the current data transfer in progress to determine the optimal point to begin the last transfer of data from the buffer device 104 to the I/O unit 102, so that the last bit of data is transferred from the buffer device 104 at substantially the same time the data channel 108 transmits the last bit of data to the I/O unit 102. As long as the measured data rate from the data channel 108 to the buffer device 104 exceeds the measured data rate of the buffer device 104 to the I/O unit 102, then data transfers from the buffer device 104 to the I/O unit 102 are allowed to begin as soon as the data channel 108 data transfer to the buffer device 104 has begun. However, when the data channel 108 data rate to the buffer device 104 drops below the buffer device 104 transfer rate to the I/O unit 102, the start of the transfer of data from the buffer device 104 to the I/O unit 102 must be delayed in order for the transfer of the last bit to coincide with the end of the transfer of data from the data channel 108 to the buffer device 104. This delay allows the completion of the transfer from the buffer device 104 to the I/O unit 102 to occur at substantially the same time that the last bit of data is transferred from the data channel 108 to the buffered device 104. The completion of the data transfer followed by hardening of the data by the I/O unit 102 can then be reported as quickly as possible to the data channel 108 and the host unit 106.

In one embodiment, the data channel 108 transfer rate to the buffer device 104 is measured while the data transfer is in progress. The data transfer rate is calculated by dividing the number of bytes transferred at the time of the measurement by the difference between the beginning of the data transfer and the end of the data transfer. However, a minimum transfer of length K 202, as shown in FIG. 2A, is required before the "stalling" effects of data transmission buffering as discussed below can be seen in the data transfer rate measurement. Therefore, the measurement of the data transfer rate is not taken until a minimum number of bits has been transferred.

The minimum transfer length K 202 depends on various design attributes of the interfaces between host unit 106, data channel 108, and the buffer device 104. For example, "stalling" may occur due to: the "scatter/gather" attributes used by host unit 106 in gathering data to be transmitted to the data channel 108; "data rate droop" may occur due to the limited buffering capabilities common within host units and buffer devices; the burst size of transmissions through the host unit 106 interface with the data channel 108 and the transfer of data from the data channel 108; and, the buffer device 104 causing pauses in the continual flow of data. Because of the interruptions in the continual flow of data, any transfer attempted below a minimum transfer size K 202 will not reflect an accurate data rate.

Turning to FIG. 2B, one embodiment of the invention anticipates and coordinates the transfer of the last bit of data from the data channel 108 to the buffer device 104 to assure the transfer substantially coincides with the last bit of data being transferred from the buffer device 104 to the I/O unit 102. A third data transfer 230 representing a group of data blocks transferred between the data channel 108 and the buffer device 104 is shown in FIG. 2B and represented by blocks of various sizes. A fourth data transfer group 232 is also shown representing a transfer of data blocks between the buffer device 104 and the I/O unit 102. In this version of the present invention, only a data block 214 in a transmission of data is monitored. Each data block transferred is stored in the buffer device 104 and forwarded to the I/O unit 102 except for the last block in the series of transmissions represented as block 214. Using the method of the present invention described below, block 214 is transferred from the data channel 108 to the buffer device 104 at substantially the same time as the buffer device 104 transfers the last bit of data to the I/O unit 102. The time difference is indicated as $t_i$ 226 in FIG. 2B.

In another embodiment, the present invention may be applied to each field exceeding the minimum data segment size K 202. As shown in FIG. 2C, a fifth group of data blocks 236 transferred between the data channel 108 and the buffer device 104 is shown, as is a sixth group of data blocks 238 representing the transfer of data between the buffer device 104 and the I/O unit 102. Several empty data blocks 240 are present in the sixth group of data blocks 238, as are data blocks of varying lengths. As shown in the FIG. 2C, the transfer of the last byte of data from the fifth group 236 and the sixth group 238 substantially coincide as represented by $t_i$ 228 approaching zero (0). Ideally, $t_i$ 228 equals zero (0). In other words, the I/O unit 102 receives the transferred data from the data channel 108 at substantially the same time that the data channel 108 transmitted the data to the buffer device 104. The data passes through the buffer device 104 without delay and is transferred directly to the I/O unit 102. Assuming $t_h$=0, the I/O unit 102 may immediately signal the buffer device 104, data channel 108, and host unit 106 that the data transfer has been completed. If $t_h$=0, the I/O unit 102 signals as soon as hardening of the data is completed. In this version of the present invention, each data block of the fifth group of data blocks 236 of a length less than K 202 units would not be monitored. However, as shown by data blocks marked 216, 217, 219 and 220, the data blocks exceeding a minimum size of K 202 units would be monitored so that the transmission of the last byte of data from the data channel 108 to the buffer device 104 could be coordinated to substantially coincide with the transfer of the last byte of data from the buffer device 104 to the I/O unit 102. Data blocks which have a size less than K 202 units such as blocks 218 and 221 would not be considered. By measuring only data blocks exceeding a minimum length of K 202 units, as opposed to the situation in FIG. 2B where only the last data block 214 in a series of transmissions would be measured, a greater degree of predictability is ensured.

OPERATION

In addition to the various hardware embodiments described above, a different aspect of the invention concerns a method to reduce or eliminate the delay between the time the last bit of data is transferred from the data channel to the I/O unit and the total time the host unit is involved in performing the data transfer function.

Signal-Bearing Media

Such a method may be implemented, for example, by operating the buffer data device to execute a sequence of machine-readable instructions. These instructions may reside in various types of signal-bearing media. In this respect, one aspect of the present invention concerns an article of manufacture, comprising signal-bearing media tangibly embodying a program of machine-readable instructions executable by a digital data processor to perform a method to reduce or eliminate the delay between the time the last bit of data is transferred from the data channel to a buffer unit and the time an I/O unit receives the data. By reducing or eliminating the buffer delay, the total time the host unit 106 (shown in FIG. 1) is involved in the data transfer is reduced.

Figure 4:
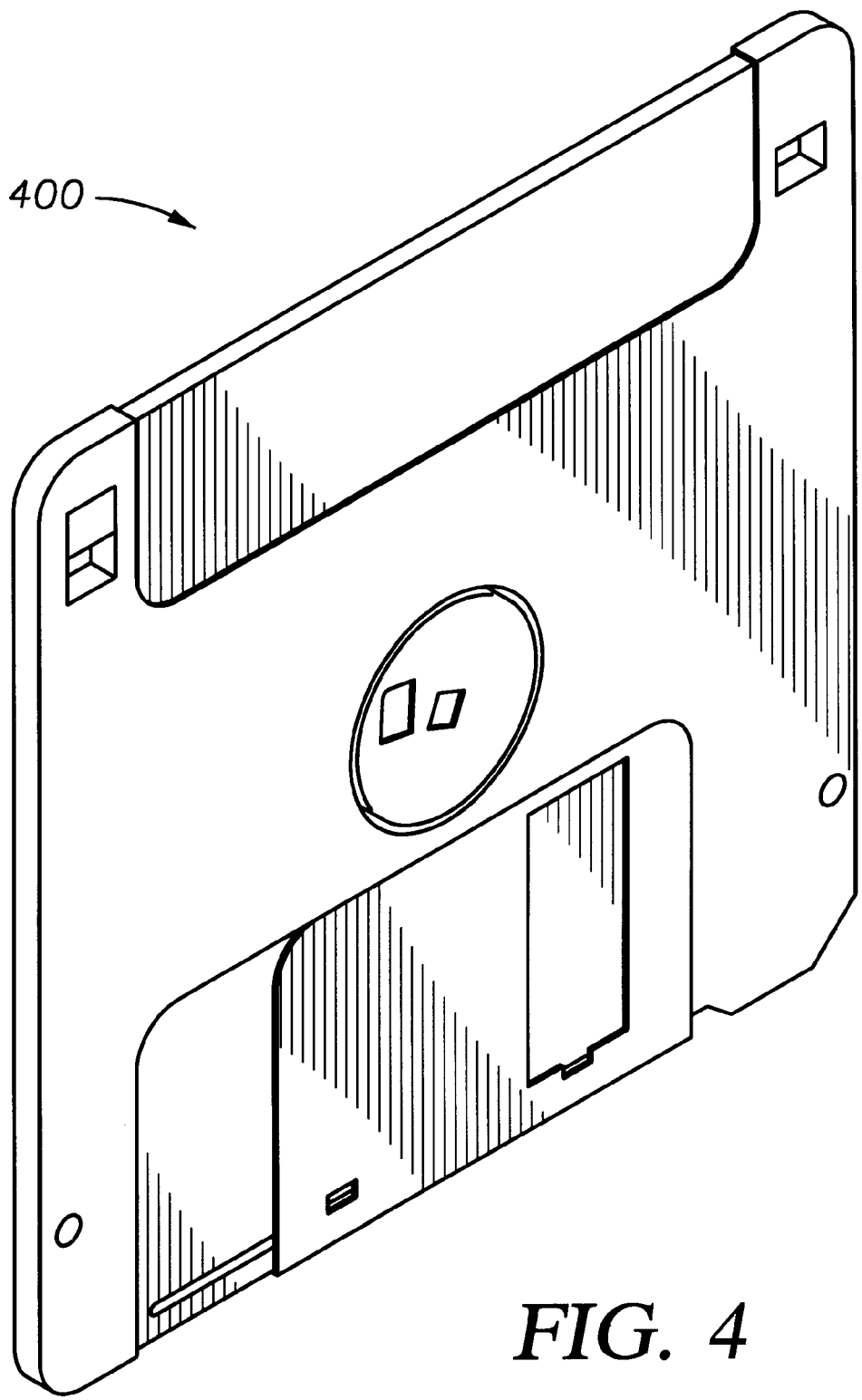
FIG. 4 is an exemplary example of a signal-bearing medium tangibly embodying a program of machine-readable instructions executable by a digital processing apparatus to perform the operational sequence for a dynamic speed matching method in accordance with one embodiment of the invention.

This signal-bearing media may comprise, for example, RAM (not shown) contained within buffer system 100. Alternatively, the instructions may be contained in another signal-bearing media, such as a magnetic data storage diskette 400 (FIG. 4), directly or indirectly accessible by the buffer system 100. Whether contained in the buffer system 100 or elsewhere, the instructions may be stored on a variety of machine-readable data storage media, such as DASD storage (e.g., a conventional "hard drive" or a RAID array), magnetic tape, electronic read-only memory (e.g., CD-ROM or WORM), an optical storage device (e.g., WORM), paper "punch" cards, or other suitable signal-bearing media including transmission media such as digital and analog and communication links and wireless. In an illustrative embodiment of the invention, the machine-readable instructions may comprise lines of compiled higher level computer language code.

Overall Sequence of Operation

Figure 3:
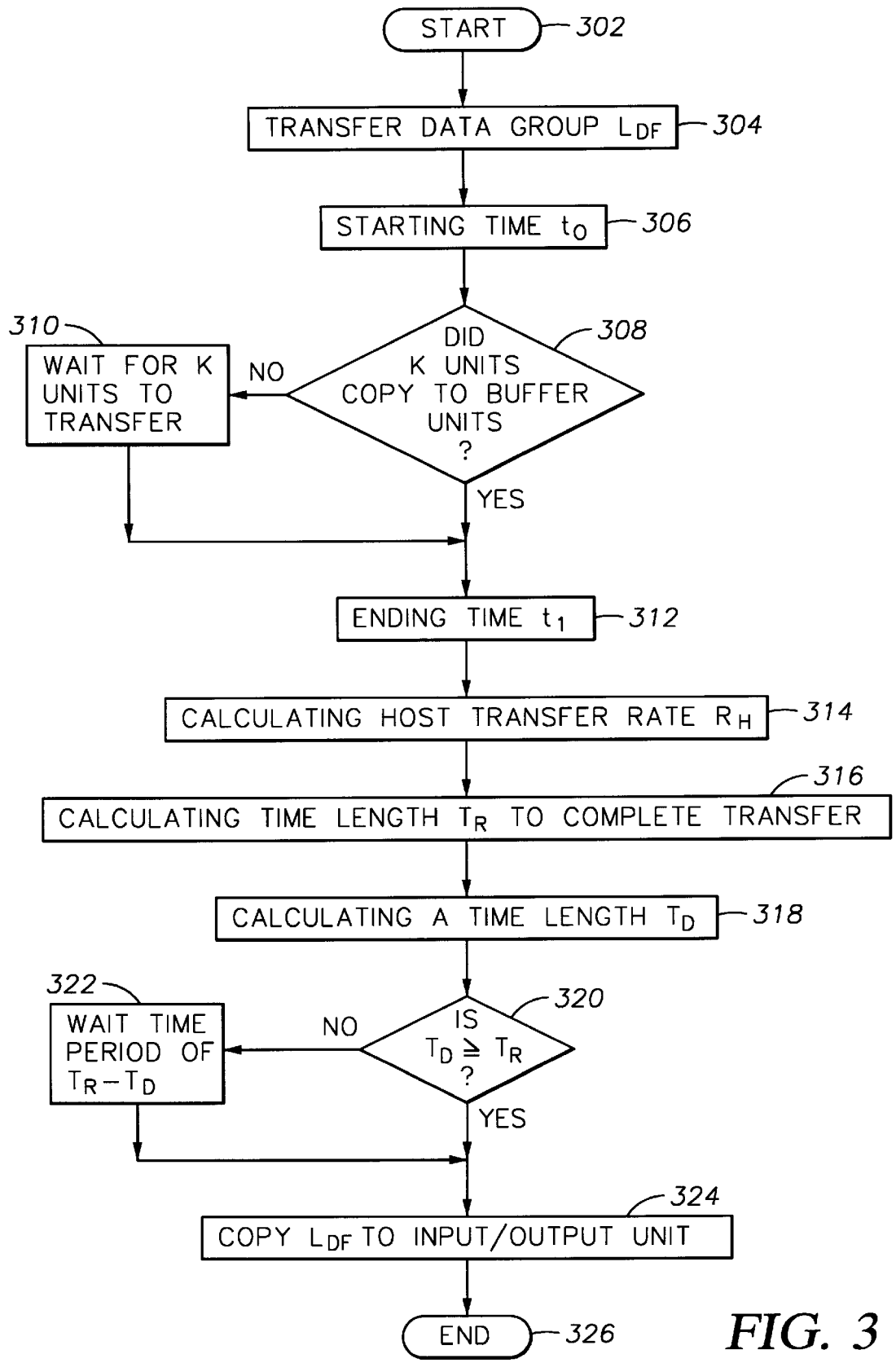
FIG. 3 is a flowchart of an operational sequence for a dynamic speed matching method in accordance with one embodiment of the invention.

FIG. 3 shows a sequence of method steps 300 to illustrate one example of the method aspect of the present invention. For ease of explanation, but without any limitation intended thereby, the example of FIG. 3 is described in the context of the buffer system 100 described above. The steps are initiated in task 302, when the host unit 106 signals data channel 108 that a transfer of data to the I/O unit needs to occur.

A data segment of length $L_{DF}$ is then transferred from the host unit 106 via the data channel 108 to the load control unit 118. A data segment is part of a data group and may comprise one or numerous data blocks. The load control unit 118 is interfaced with the load address counter 116 and used to coordinate the loading of the data segment $L_{DF}$ into the buffer device 104. The load address counter 116 is interfaced with the load control unit 118 and provides the data group $L_{DF}$ to address unit 110. The buffer unit 104 is signaled by load/unload line 138. Assuming that data segment of length $L_{DF}$ has at least one block of a minimum length K units, the data is measured by the buffer device 104 as it is received from the memory address bus 134. After the transfer of the data segment of length $L_{DF}$ has begun in task 304, the time the data transfer began from the data channel 108 to the buffer device 104 is recorded by the buffer device 104 in task 306 as a time $t_0$. If a block of the data segment $L_{DF}$ exceeds K units in length as shown in task 308, then buffer device 104 records the ending time $t_1$ in task 312 at the time the last bit of the data segment $L_{DF}$ is received by the buffer device 104.

If a data block of data segment $L_{DF}$ did not exceed K units in length, then the buffer device 104 begins transferring the data received until a data segment of K units in length has been transferred in task 310. Once a block of data segment $L_{DF}$ exceeding K units in length is received by the buffer device 104, the ending time marking the receipt of the last bit of data is recorded in task 312.

In the preferred embodiment, based upon a starting time $t_0$ recorded in task 306 and an ending time $t_1$ recorded in task 312, and having determined the length $L_{DF}$ of the data segment being transferred, the length being determined by monitoring the data transferred to the buffer device 104, the host transfer rate is calculated in task 314. The host transfer rate $R_H$ is equal to the length $L_{DF}$ of the data segment transferred divided by a time $t_1$ the data transfer began minus the time $t_0$ that the data segment transfer to the buffer device 104 ended. In task 316, the time needed to complete the transfer of the data group from the host unit 106 to the buffer device 104 is calculated. The host unit 106, knowing the size of the data group to be transferred, and knowing the host transfer rate $R_H$, the remaining time to complete the transfer of the entire data group is calculated as $T_R$ which is equal to the length of the data group to be transferred from the host unit 106 to the I/O unit 102 divided by the measured host transfer rate $R_H$.

Because the time required to transfer the data group of a known length N from the buffer device 104 to the I/O unit 102 may vary from the time required to transfer the data group from the host unit 106 to the buffer device 104—based upon the difference in data transfer rates between the data channel 108 and the I/O unit 102—the time required to complete the transfer from the buffer device 104 to the I/O unit 102 is calculated in task 318. The time $T_D$ required to finish the transfer of data to the I/O unit 102 is equal to the length N of the data group to be transferred divided by $R_D$, where $R_D$ is the rate of transfer inherent to the I/O unit 102. Inherency of the rate of transfer of the I/O unit 102 is dependent upon the rate of transfer of the I/O unit 102. The rate of transfer is a configuration choice commonly made at installation or some time during the operation of the entire system. The rate may depend on the nature of the connection between the I/O device and the buffer device. Regardless of whether the transfer rate is fixed or varies during operation, the transfer rate at any given time may be determined for the duration of a given transfer.

In any event, if a time required to transfer a data segment from the buffer device 104 to the I/O unit 102 is greater to or equal to the time required to complete the transfer of the data segment from the host unit 106 to the buffer device 104, then the buffer device 104 may begin to transfer data as the data is received from the data channel 108. Otherwise, the buffer device 104, in one embodiment, waits a time period equal to the time remaining to complete the transfer of data from the host unit 106 to the buffer device 104 minus the time required to transfer the data from the buffer device 104 to the I/O unit 102 as shown in task 322. Assuming that $T_D \geq T_R$, the data segment of length N is written from the buffer device 104 to the I/O unit 102 in task 324. Upon completion of the write to the I/O unit 102, the method ends in task 326.

The implementation of the present invention may only be practiced when a data segment is being transferred from the data channel 108 to the buffer device 104 and then from the buffer device 104 to the I/O unit 102. In instances where it is desirable to transfer data segments or data fields of varying types, such as control data segments destined for the buffer unit and not the I/O unit, the transfer of data is not monitored. In another embodiment, if a data segment or data field is not greater than K 202 units in length, the data channel 108 data rate measurement will not be executed because by the time the measurement can be made the data transfer is complete or all but complete. In this situation, the amount of time saved between the completion of the final transfer of the last bit of the data segment or data field to be written by the data channel and the return of the data receive signal from the I/O 102 is so small no practical advantage may be gained by implementing the current invention. In these types of situations, the data segment or data field is transferred as described above and subsequent transmissions of data are monitored to provide the benefits of the present invention.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for measuring a data transfer in progress between a data channel and a buffer device to coordinate the start of data transfer between the buffer device and an input/output (I/O) unit, the transfer between the buffer device and the I/O unit concluding substantially simultaneous to the arrival of the last data transferred from the data channel to the buffer device, comprising:

transferring a data segment $L_{DF}$ from the data channel to the buffer device, where $L_{DF}$ is included in a data group of length N being transferred;

storing a time $t_0$ designating the time transfer of $L_{DF}$ begins;

waiting for a data block of at least K units of data segment $L_{DF}$ to be transferred to the buffer device, $L_{DF}$ having a last data block having a last unit;

storing a time $t_1$ designating the time the last unit of the last block of segment $L_{DF}$ is transferred to the buffer device;

calculating the data channel transfer rate $R_H$ using $L_{DF}$, $t_0$ and $t_1$;

calculating a time length $T_R$ indicating the time remaining to complete the transfer of the data group of length N to the buffer device; and calculating a time length $T_D$ required to transfer the remaining segments of the data group of length N from the buffer device to the I/O unit, and if $T_D \geq T_R$:

transferring the data group to an I/O unit, otherwise:
      waiting a time period at least of length $T_R-T_D$ before transferring the data group to the I/O unit.

2. The method of claim 1, wherein transferring the data segment of length $L_{DF}$ from the data channel to the buffer device includes:

designating a minimum acceptable data transfer length of K units;

measuring the length $L_{DF}$ of the data segment; and transferring the data group of length N from the data channel to the buffer device if the length of any data segment within data group of length N is greater than or equal to K units.

3. The method of claim 1, the channel transfer rate $R_H = L_{DF}/(t_1-t_0)$.

4. The method of claim 3, where $T_R = (N-L_{DF})/R_H$.

5. The method of claim 1, where $T_D = N/R_D$ where RD is the average transfer rate for the I/O unit.

6. A method for measuring a data transfer in progress between a data channel and a buffer device to coordinate the start of data transfer between the buffer device and a I/O unit so that the transfer between the buffer device and the I/O unit concludes substantially simultaneous to the arrival of the last data copied from the data channel to the buffer device, comprising:

designating a minimum acceptable data transfer length of K units;

measuring a data segment L having a length $L_{DF}$, the data segment L being a portion of a data group of length N being currently transferred, the data segment L having a last transferred unit E, and if $L_{DF} \geq K$ units:

transferring segment L to the buffer device from a data channel;

storing a time $t_0$ designating the time transfer of the segment L began from the host channel to the buffer device;

waiting for at least K units of the segment to be transferred to the buffer device, the at least K units being a portion of the data group of length N;

storing a time $t_1$ designating the time last unit E is transferred to the buffer device from the host channel;

calculating the channel transfer rate $R_H$ using $L_{DF}$, $t_0$ and $t_1$;

calculating a time length $T_R$ indicating the time remaining to complete the transfer of the data group of length N from the host channel to the buffer device; and calculating a time length $T_D$ required to transfer the data group of length N from the buffer device to the I/O unit, and if $T_D \geq T_R$:

transferring the remaining data group to the I/O unit, otherwise:

waiting a time period at least of length $T_R - T_D$ before transferring data to the I/O unit.

7. The method of claim 6, the channel transfer rate $R_H = L_{DF}/(t_1 - t_0)$.

8. The method of claim 7, the time length $T_R = (N - L_{DF})/R_H$.

9. The method of claim 6, the time length $T_D = N/R_D$, where $R_D$ is the average transfer rate for the I/O unit.

10. A signal-bearing medium tangibly embodying a program of machine-readable instructions executable by a digital processing apparatus to perform a method for measuring a data transfer in progress between a data channel and a buffer device to coordinate the start of data transfer between the buffer device and an I/O unit, the transfer between the buffer device and the I/O unit concluding substantially simultaneous to the arrival of the last data transferred from the host to the buffer device, said method comprising:

transferring a data segment $L_{DF}$ from the data channel to the buffer device, where data segment $L_{DF}$ is a part of a data group of length N being currently transferred;

storing a time $t_0$ designating the time transfer of the data segment $L_{DF}$ begins;

waiting for a data block of at least K units of the data segment $L_{DF}$ to be transferred to the buffer device, the data segment $L_{DF}$ having a last data block having a last unit;

storing a time $t_1$ designating the time the last unit of the last block of the data segment $L_{DF}$ is transferred to the buffer device;

calculating the data channel transfer rate $R_H$ using $L_{DF}$, $t_0$ and $t_1$;

calculating a time length $T_R$ indicating the time remaining to complete the transfer of the data group of length N to the buffer device;

calculating a time length $T_D$ required to transfer the remaining segments of the data group of length N from the buffer device to the I/O unit, and if $T_D \geq T_R$:

transferring the data group to an I/O unit, otherwise:

waiting a time period at least of length $T_R - T_D$ before transferring the data group to the I/O unit.

11. The signal-bearing medium of claim 10, the method further comprising:

designating a minimum acceptable data transfer length of K units;

measuring the length $L_{DF}$ of the data segment; and transferring the data group of length N from the data channel to the buffer device if the length of any data segment within data group of length N is greater than or equal to K units.

12. The signal-bearing medium of claim 10, the channel transfer rate $R_H = L_{DF}/(t_1 - t_0)$.

13. The signal-bearing medium of claim 12, the time length $T_R = (N - L_{DF})/R_H$.

14. The signal-bearing medium of claim 10, the time length $T_D = N/R_D$, where $R_D$ is the average transfer rate for the I/O unit.

15. An apparatus to measure a data transfer in progress between a data channel and a buffer device to coordinate the start of data transfer between the buffer device and a peripheral unit, the transfer between the buffer device and the peripheral unit concluding substantially simultaneous to the arrival of the last data transferred from the data channel to the buffer device, comprising:

a host unit;

a data channel communicatively coupled with the host unit and having data transferrable at variable data rates;

a peripheral unit;

a buffer device communicatively coupled to the peripheral unit and the data channel to transfer a data group having at least one data segment L being only a portion of the data group, receiving the data segment L from the data channel, and operative for storing identities of the data segment L transfer start time indicating when the data segment L transfer from the data channel to the buffer device started, and a data transfer finish time indicating when a last unit of data segment L was received by the buffer device from the data channel; and a processor unit communicatively coupled to the buffer device and used to signal the buffer device to begin transfer of a last unit of the data group from the buffer device to the peripheral unit, the transfer occurring substantially simultaneous to arrival of the last segment of the data group received by the buffer device from the data channel, the signal determined by the processor unit based upon monitoring the current transfer of the at least one data segment L in progress between the data channel and the buffer device.

16. The apparatus of claim 15 wherein the processor unit is programmed to release the data channel until the first segment of data has been received by the memory unit.

17. The apparatus of claim 15, the transfer of the last segment of the data from the buffer device to the peripheral unit occurring substantially simultaneous to the arrival of the last unit of the data group received by the buffer device from the data channel, including:

the data channel having a transfer rate $R_H = L_{DH}/(t_1 - t_0)$, where $L_{DF}$ is the length of the data segment L being transferred, $t_0$ is the identity of the data transfer start time, and $t_1$ is the identity of the data transfer finish time;

$T_R = (N - L_{DF})$, where $T_R$ is the length of time remaining for transfer of the data group, the data group having a length N; and $T_D = N/R_D$, where $T_D$ is the time required to transfer the data group of length N from the buffer device to the peripheral unit, and where $R_D$ is the average transfer rate for the peripheral unit.

18. The apparatus of claim 15, including:

a load buffer device communicatively coupled to receive data from the data channel into the buffer device;

an unload buffer device communicatively coupled to transfer data received by the buffer device to the peripheral unit at a rate determined by a data transfer rate preset for the peripheral unit; and a comparator unit communicatively coupled to enable the unload buffer device when the load buffer device loads data into the buffer device, whereby data transfer is initiated before the buffer device has completely filled.

* * * * *